United States Patent [19]

Guenthner

[11] 4,230,010
[45] Oct. 28, 1980

[54] DEVICE FOR CUTTING GLASS

[75] Inventor: Franz Guenthner, Mainz, Fed. Rep. of Germany

[73] Assignee: JENAer Glaswerk Schott & Gen., Fed. Rep. of Germany

[21] Appl. No.: 27,043

[22] Filed: Apr. 4, 1979

[30] Foreign Application Priority Data

Apr. 26, 1978 [DE] Fed. Rep. of Germany ....... 2818234

[51] Int. Cl.³ .............................................. C03B 5/38
[52] U.S. Cl. ........................................ 83/600; 83/602
[58] Field of Search ......................... 83/600, 601, 602; 65/334, 303, 133

[56] References Cited

U.S. PATENT DOCUMENTS 2,812,619  11/1957  Wythe ................................... 83/600

OTHER PUBLICATIONS

W. Giegerich et al., *Glasmachinen*, Springer-Verlag, Berlin/Gottingen/Heidelberg, 1964, pp. 158, 159 and 174.

*Primary Examiner*—James M. Meister
*Attorney, Agent, or Firm*—Hill, Van Santen, Steadman, Chiara & Simpson

[57] ABSTRACT

A device for cutting glass for example separating a drop or portion of a plastic glass skein emerging from a feeder characterized by having two shear arms mounted for rotation in a common frame, each of the shear arms being provided with a knife at its extreme end and a device for periodically moving the arms in a pincher-like closing movement toward one another and away from one another so that the knives can execute a cutting process. The device for periodically moving includes a device for forming a periodic working cycle preferably comprising at least one cam having one segment forming a working stage of a working cycle and a second segment forming an idle stage. By varying the speed of rotation of the cam while the follower is in the second stage, a time delay between the closing of the knives can be adjusted without changing the speed of movement during a cutting stage.

20 Claims, 5 Drawing Figures

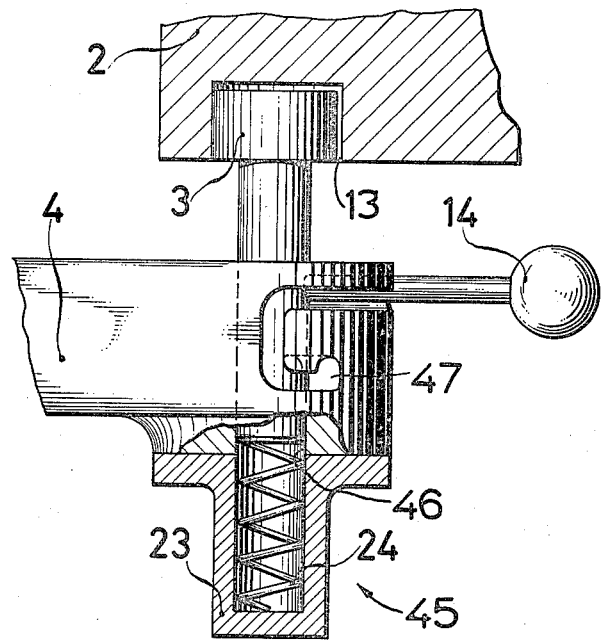
FIG. 4
FIG. 5
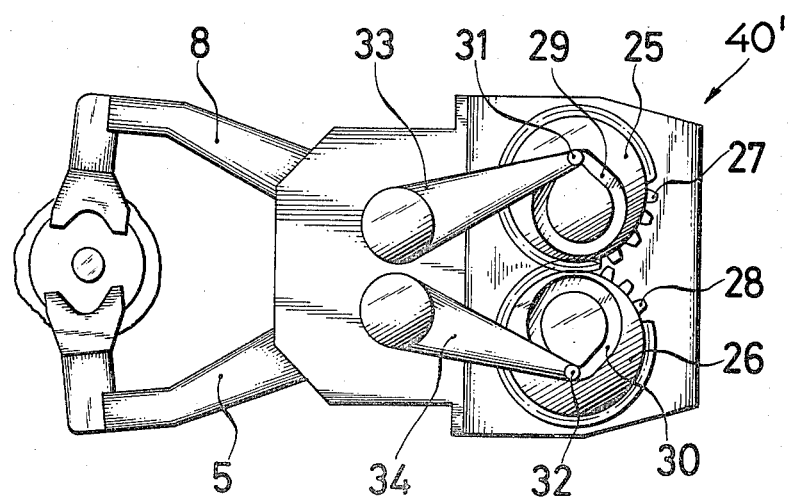

DEVICE FOR CUTTING GLASS

BACKGROUND OF THE INVENTION

1. Field of the Invention

The present invention is directed to a device for cutting glass, for example for separating a drop or a portion from a plastic glass skein which is emerging from a feeder. The device includes two shear arms mounted for rotation in a common frame with each of the shear arms being provided with a knife at its extreme end and means for periodically rotating the arms to move in a pincher-like closing movement toward one another and away from one another so that the knives execute a cutting process. In particular, the invention is directed to the improvement in the means for periodically rotating the arms.

2. Prior Art

In a glass cutting process such as the process used to cut glass in a drop feeder, the knives move in a path during a working cycle which have a plurality of different individual segments. These segments are the segment as the knives are cutting the glass skein, the segment as the knives are being separated from the glass, the segment of the path of the knives moving to and from the glass skein as well as the segment of the path of the knives being held in the removed position. It is desirable to select the speed of movement of each of the knives in the individual path segments at an optimum speed or level for each of these path segments independent on the machine drive. By so doing, one achieves the shortest time for a working cycle without exceeding the speed in any critical path segment, for example the speed of the knives cutting the glass. It is also desirable to have a device in which a large range of cuts per unit time can be achieved. Thus, it is desirable to maintain the optimum speed for each of the segments of the working cycle without any change over the large range of cuts per unit time without requiring conversion of the device or replacement of the drive elements, for example a radial cam.

Known devices only partially fulfill the above mentioned desirable conditions. In a book by Giegerich and Trier, Glasmaschinen, Springer-Verlang, Berlin/Göttingen/Heidelberg, pp. 158, 159, a device for cutting glass is described which is driven by means of the cam plate which rotates at a uniform speed, which, however, is dependent on the number of cuts per unit time to be executed and thus the device directly depends on the machine drive. If a change in the number of cuts per time unit occurs, the speed of the temporal movement of the knives during each segment also changes which leads to changes in the cutting condition. In order to overcome this disadvantage one has a recourse to utilize a different cam for different ranges of the number of cuts per time unit and one must accept changes in the cutting conditions within the cutting count range of a given cam. For example, for a cutting count range of 5 to 110 cuts per minute, 20 different curves are required as shown by the chart D3 on page 174 of the above mentioned book. Also, a cut count of less than 3 per minute cannot be achieved or can only be achieved with the greatest difficulty. In this known cutting device, only the power for opening the shear is produced by the following roller of the cam. The force for closing is generally by means of a mechanical or pneumatic spring. This force is either permanently effective, for example, also opposing opening the knives and namely opposite the force of the cam follower lever or can be switched off upon opening, for example, in the case of a pneumatic spring. When the force is only applied during closing, a reversing process is required which, in turn, requires switching elements that are susceptible to wear and are also subject to frequent maintenance. Thus, additional outlay will occur with this device.

Another known drive for a device for cutting glass is disclosed in U.S. Pat. No. 2,812,619. In this device, the drive utilizes a hydraulic or pneumatic piston in a cylinder. With this drive, it is indeed possible to let the movement of the knives proceed with a constant speed over a relatively large range of cut counts per time unit. However, the device does not allow the speed sequence to be optimally adapted to the individual movement phases of the knives. For reversing the respective direction of movement of each knife, a reversing process of the piston is required and mechanical stops are usually required for the exact positioning of the knives, particularly the final position for closing the knives in the cutting operation. The reversing process for the piston requires a length of time, which is independent of the respective cut count and thus, must be readjusted upon changing the number of cuts per time unit if a corrected cut and a short glass contacting time are to be achieved. Interruptions in the course of manufacture arise because of this readjustment. On the other hand, the knives are caused to vibrate due to the reciprocal motion of the piston and the striking of the shear arms on the mechanical stops used to hold them in the desired position. These vibrations will cause the quality of the cut to be negatively influenced. The momentum required for perpendicular descent or for the displacement of the drop of glass fluctuates and the drop of glass will fall irregularly into the form or mold. This irregular falling of the drop will have a negative effect both on the course of the production and the quality of the production.

SUMMARY OF THE INVENTION

The present invention is directed to providing a device for cutting glass which has a drive in which the speed of movement of the knives from the smallest desired number of cuts per unit time to the highest number of cuts per time unit, for example 200 cuts per minute, can be essentially independent of the number of cuts per time unit with only a few or no replacement parts in the drive element. It is also an object of the invention that the speed of the knife movement is adapted in an optimum manner to the individual movement segments of the path of the working cycle of the knives. Thus, the time delay and reversing process in the critical phase of the direct separation of the glass drop as well as the mechanical stops causing vibrations are avoided.

To accomplish these objects or tasks, the present invention is directed to an improvement in a device for cutting glass, for example separating a drop or portion of a plastic glass skein emerging from a feeder, said device having two shear arms mounted for rotation in a common frame, each of said shear arms being provided with a knife at its extreme end and means for periodically rotating the arms to move in a pincher-like closing movement toward one another and away from one another so that the knives execute a cutting process. The improvement comprises the means for periodically rotating including means for forming a periodic working cycle, said working cycle having two different stages with one stage being a working stage in which the shears execute the cutting process with a temporal sequence of movement which is essentially unalterable in its operating time from a given drive setting and the other stage being an idle time stage in which the knives are in an open position and the temporal sequence of movement can be changed within broad limits.

In the preferred embodiment, the means for forming a periodic working cycle includes at least one cam plate having a cam follower, said cam plate being mounted for rotating and having a circular continuous cam path engaged by the follower, said cam path having an idle time sector of an angle α being engaged by the follower during the idle time stage of the working cycle and a working sector of an angle of 360°-α being engaged by the follower during the working stage of the drive cycle, and means for rotating the cam plate with the speed of rotation of the plate during engagement of the follower in the idle time sector being different from the essentially unchanged speed of rotation of the plate during engagement of the follower in the working sector. By selecting the type of drive, it is possible for the angle α of the idle time sector to assume an angle of approximately 0° and the means for rotating the cam plate during the idle stage rotates the cam at a speed of substantially 0. In other words, when the cam follower reaches the idle time sector, the cam plate is not rotated for a time depending on the number of cuts per time unit. After holding the cam plate substantially stationary for a given length of time, the cam plate is again rotated to have the follower move along the cam surface or path during the working stage.

In another embodiment, the idle time sector α assumes a finite angle and the cam surface or path in the idle time sector has a constant radius. During the idle time stage, the follower moves on the cam surface and the speed of the rotation for the cam plate is adjusted depending on the number of cuts per unit of time. With both of the above examples, it is possible to always execute the actual work of the shears for cutting the glass as the follower is in the working sector of the cam plate with a constant speed of movement independent of the number of cuts that are to be made by the machine during a given length of time. Therefore, by a special formation of the cam path or surface in the working sector of the cam plate, it is possible to optimally adapt the speed in each of the individual path segments of the working shears to the demand of the individual movement phases of the shear. Thus, the entire work cycle is adapted to the respective cut count of the machine in that in the first case the cam plate is stopped while the follower is in the idle time sector for more or less a period of time depending on the number of cuts per unit of time. In the second embodiment, the cam plate is rotated at a different speed when the follower is in the idle time sector than when the follower is in the working time sector.

The cam plate is preferably formed as a rabbet cam plate with the cam path or surface being formed as a groove forming a double acting cam paths or surfaces. Preferably, the follower is a roller disposed in the groove and is mounted on a lever arm by means for enabling movement of the follower in a direction of the axis of rotation of the follower, said means for mounting including means biasing the follower to a first position in the groove of the cam plate and the device preferably has means for locking the follower in a retracted or second position withdrawn from the groove of the cam plate.

If a single cam plate is utilized, the follower which is mounted on the lever arm is attached operably to one of the shear arms and the two shear arms are coupled together by means of gears so that rotation of the one shear arm in the one direction causes rotation of the other shear arm in the opposite direction. In another embodiment, a pair of cam plates are mounted for rotation and interlocked so that one plate rotates in one direction as the other plate rotates in the opposite direction, each of the cam plates has a cam follower engaged on its cam surface with one of the followers being operably connected to one of the shear arms and the other follower being operably connected to the other shear arm. Each of the cam plates may be a rabbet plate having a groove forming double acting cam surfaces and each of the followers is preferably mounted by means allowing axial movement between the first position engaged in the groove of its respective cam plate and a second position withdrawn or retracted from engagement in the groove.

Each of the embodiments of the device may operate with the cams controlling movement of the shear arms both during a cutting and separating sequence or the arms may be urged together by either a mechanical spring or a pneumatic spring with the cam follower only opposing the spring action to cause opening of the shear arms after the cutting operation. It is also desirable to provide the cutting arms with means for storing part of the energy created during closing of the arms to form the cut and utilizing this energy during the initial separating step. This means includes at least a spring disposed on one of the arms and engaged by a member on the other arm so that the spring stores the energy and releases it as the shear arms are moved from a closed toward an open position.

The cam plates can be rotated by a drive means which may be electrical, pneumatic or hydraulic. In addition, the drive means which may include a motor, which is either electrical, pneumatic or hydraulic may include a drive train which has a clutch in the arrangement to enable switching the output speed of the motor in response to sensing the movement of the cam follower from one segment or portion of the cam surface into the other sector or portion of the cam surface.

BRIEF DESCRIPTION OF THE DRAWINGS

FIG. 4 is an enlarged partial cross-sectional view showing the means for mounting a follower in a groove of a cam plate; and FIG. 5 is a bottom view of another embodiment of a device in accordance with the present invention.

DESCRIPTION OF THE PREFERRED EMBODIMENTS

Figure 1:
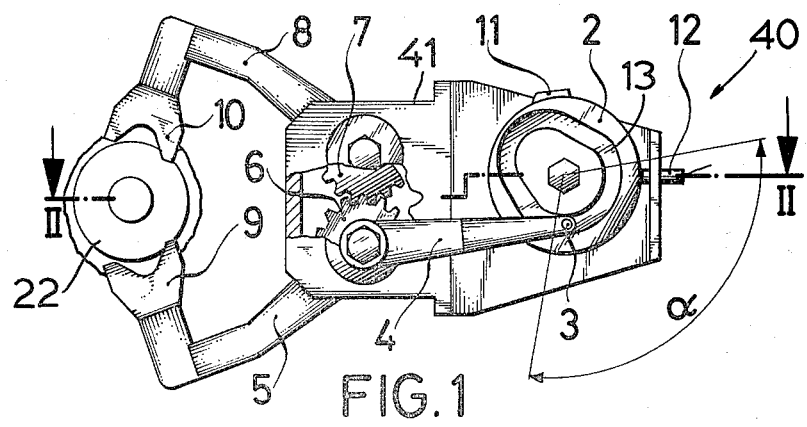
FIG. 1 is a bottom view of the first embodiment of the device in accordance with the present invention.
Figure 2:
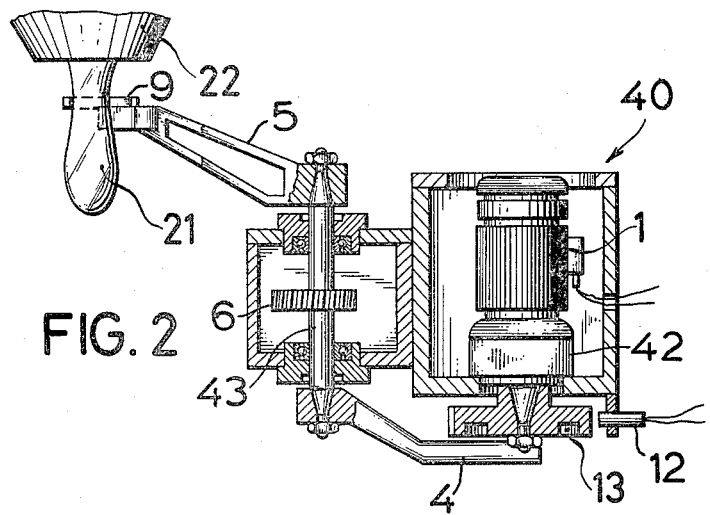
FIG. 2 is a partial cross section with portions in elevation for purposes of illustration taken along lines II—II of FIG. 1.
Figure 3:
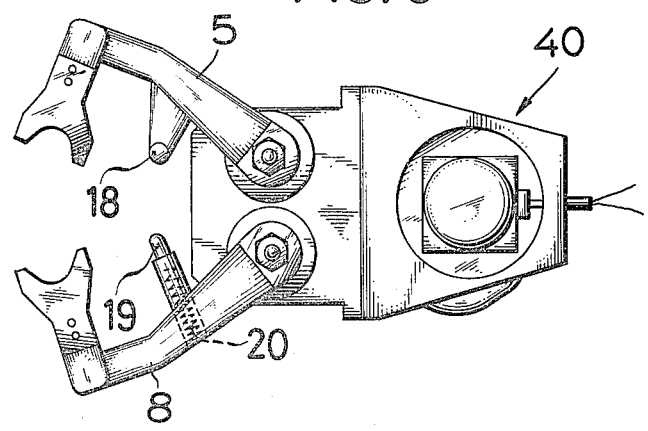
FIG. 3 is a top view of the device of FIG. 1 with the arms being provided with means for storing energy.

The principles of the present invention are particularly useful in a device generally indicated at 40 in FIGS. 1, 2 and 3 for cutting a drop or portion from a skein 21 of glass which is being extruded or is emerging from a mouth 22 of a feeder (FIG. 2).

The device 40 includes a frame 41, which supports a pair of shear arms 5 and 8 for rotation. In addition, the frame supports a motor 1 (FIG. 2) which may be put into operation by a signal relayed from a control of the production system or device. A cam plate 2 is connected by a drive train 42 to the motor 1 to be rotated thereby. As illustrated, the cam plate 2 is a rabbet cam plate having a groove 13 which forms double cam surfaces for receiving a follower 3. The follower 3 is illustrated as a roller which is mounted for rotation on the end of a lever 4 by means 45 for mounting (see FIG. 4). The lever 4 is connected on a shaft 43 which rotatably supports one of the shear arms 5. The shaft 43 also supports a gear segment or gear 6, which meshes with the gear 7 contained on a shaft that rotatably supports the other shear arm 8 so that rotation of the shaft 43 and its arm 5 in a clockwise direction causes rotation of the arm 8 in a counterclockwise direction to form a pincher-like movement. Each of the arms 5 and 8 support knives at one end with the arm 5 having a knife 9 and the arm 8 having a knife 10 which knives coact to cut the drop or portion from the glass skein 21.

The cam plate 2, as best illustrated, has the cam surface formed by the groove 13 with an idle sector of an angle $\alpha$, which has a constant radius, and the remainder working sector has an angle of $360°-\alpha$. In addition, the cam has a projection or lobe 11, which is positioned so that as the follower moves from the working segment into the idle sector the lobe 11 coacts with a switch 12 which indicates the occurrence of the transition between the working segment and the idle segment.

As indicated in FIG. 3, each of the arms such as 5 and 8 may be provided with means for storing a portion of the closing energy. The means includes a roller 18 which is mounted on the arm 5 and engages a pin 19 which is mounted on arm 8. When roller 18 engages pin 19, a spring 20, which is mounted on the arm 8, is compressed. With this arrangement of the roller 18, pin 19 and spring 20, shortly before the knives 9 and 10 contact the glass skein 21, part of the kinetic energy created during closing of the shear arms is stored and will be released upon the initial opening of the arms. The release of this stored energy will compensate for any backlash that may possible be present during the shifting of the direction of the arms.

With regard to the cam plate 2, the groove 13 in the cam plate is designed to provide cam surfaces in such a manner that the shear arms have the most favorable speed for the individual segments of the working cycle and remain in a substantially fixed position during the idle time cycle. By either stopping the rotation of the cam or moving it at a different speed while the follower 3 is in the area of the idle time sector, the period of time for the idle time can be varied and thus the time for rotating the cam plate through 360° can be varied over a wide range. When one operates in a cut count range of up to 200 cuts per minute with only one cam, the time of one complete rotation of the cam is in the order of 0.2 seconds.

As best illustrated in FIG. 4, the follower 3 is mounted in the groove 13 by the means 45 which enables movement of the follower in the direction of the axis of rotation of the follower. This means 45 for mounting includes a bore 46 receiving the shaft of the follower 3 and aligned with a housing 23 which supports a spring 24 acting on the shaft of the follower 3 to bias it toward a first position with the follower engaged in the groove 13. The means 45 also includes a lever 14 which can be moved in a groove such as 47 to lock the follower 3 in a withdrawn or second position to enable working on the device with the knives disengaged from the source of rotation. This thus provides a safeguard for a person working on the device while making adjustments.

In the embodiments discussed in FIGS. 1–4, the two shear arms 4 and 5 were moved together. However, they may be moved independently as illustrated in the device 40' in FIG. 5. In the device 40', the two cam plates 25 and 26 are provided and are interlocked together by means of gear segments 27 and 28 so that rotation of one of the cam plates such as 25 in a clockwise direction will rotate the other plate 26 in a counterclockwise direction. The plate 25 is a rabbet cam plate having a groove 29 receiving a follower 31, which is mounted by means similar to 45, on an arm 33 which, in turn, is operably connected to the cutting arm 8. In a similar manner, the plate 26 is a rabbet cam plate having a groove 30 receiving a follower 32. The follower 32 is mounted by means similar to the means 45 on an arm 34, which is also operably connected to the shear arm 5. If both the cam plates 25 and 26 are mirror images of each other, then the arms 5 and 8 will move in mirror image to each other. However, if the cam surfaces formed by the grooves 29 and 30 are different, asymmetric movement preferably during the closing portion of the arms 5 and 8 can be created.

While both of the embodiments illustrate utilizing the single cam or pair of cams to move the arms both in a closing pincher-like movement and an opening movement, the device may be provided with means to urge the arms such as 5 and 8 to a closing position. The means to urge may be either a spring or a pneumatic device. Thus, in such a situation, the coaction of the follower on the cam path will resist closing and open the arms against the movement of the spring.

Although various minor modifications may be suggested by those versed in the art, it should be understood that I wish to embody within the scope of the patent granted hereon, all such modifications as reasonably and properly come within the scope of my contribution to the art.

I claim:

1. In a device for cutting glass, for example for separating a drop or portion of a plastic glass skein emerging from a feeder, said device having two shear arms mounted for rotation in a common frame, each of said shear arms being provided with a knife at its extreme end, and means for periodically rotating the arms to move in a pincher-like closing movement toward one another and awat from one another so that the knives execute a cutting process, the improvements comprising the means for periodically rotating including means for forming a periodic working cycle, said working cycle having two different stages with one stage being a working stage in which the knives execute the cutting process with a temporal sequence of movement which is essentially unalterable in its operating time from a given drive setting and the other stage being an idle time stage in which the glass shears are in an open position and the temporal sequence of movement can be changed within broad limits.

2. In a device according to claim 1, wherein the means for forming a periodic working cycle includes at least one cam plate having a cam follower, said cam plate being mounted for rotation and having a circular continuous cam path engaged by the follower, said cam path having an idle time sector of an angle α being engaged by the follower during the idle time stage of the working cycle and a working sector of an angle 360°-α being engaged by the follower during the working stage of the drive cycle, and means for rotating the cam plate with the speed of rotation of the plate during engagement of the follower in the idle time sector being different from the essentially unchangeable speed of rotation of the plate during engagement of the follower in the working sector.

3. In a device according to claim 2, wherein the angle α of the idle time sector assumes an angle of approximately 0° and the means for rotating the cam plate during the idle stage rotates the cam at a speed of substantially zero.

4. In a device according to claim 3, wherein the idle time can be switched as a function of the operating speed of the machine containing the device for cutting glass.

5. In a device according to claim 2, wherein the idle time sector of an angle α is a finite angle in which the cam path exhibits a constant radius and wherein the means for rotating includes means for shifting the drive speed for the cam plate at the time of transition of the follower from the working sector into the idle time sector to an idle speed which is different in comparison to the speed of rotation of the cam during engagement by the follower in the working cycle and said means for shifting then switches the speed to the working speed upon transition of the follower from the idle time sector into the working sector.

6. In a device according to claim 5, wherein the idle time speed can be changed and selected as a function of the operating speed of the machine containing the device for cutting glass.

7. In a device according to claim 2, wherein the shear includes means biasing the shear arms to rotate toward the closed, cutting position and the opening of the shear arms from a closed position is accomplished by movement of the cam follower along the cam plate.

8. In a device according to claim 2, wherein the cam plate is a rabbet cam plate with the cam path being formed as a groove forming a double acting cam path.

9. In a device according to claim 2, wherein the cam plate is interchangeable to enable providing different cam paths for operating said shear arms.

10. In a device according to claim 2, wherein the cam follower is provided on a lever arm connected to one of said shear arms, said shear arm being engaged with the other shear arm by means of a gear so that rotation of the one shear arm in one direction causes rotation of the other shear arm in an opposite direction.

11. In a device according to claim 10, wherein the cam plate is a rabbet cam plate having a groove forming a double acting cam surface and said cam follower is a roller disposed in said groove.

12. In a device according to claim 11, wherein the cam follower is mounted on the lever arm by means for enabling movement of the follower in a direction of the axis of rotation of said follower, said means for mounting including means biasing the follower into the groove of the cam plate.

13. In a device according to claim 12, wherein the means for mounting the cam follower includes means for locking the follower in a retracted position withdrawn from the groove in the cam plate.

14. In a device according to claim 2, which includes two cam plates mounted for rotation and interlocked so that as one plate rotates in one direction, the other plate rotates in an opposite direction, each cam plate having a cam follower engaged on its cam surface, one of said followers being securely connected to one of the shear arms, and the other follower being securely connected to the other of said shear arms.

15. In a device according to claim 14, wherein the two cam plates exhibit mirror images with identical cam surfaces for oppositely equal movement of each of the shear arms during an operating cycle.

16. In a device according to claim 14, wherein each of the two cam plates exhibit different cam surfaces so that during an operating cycle, an asymmetrical closing movement of the shear arms occurs.

17. In a device according to claim 14, wherein each of the cam plates is a rabbet cam plate having a groove forming a double acting cam surface and each of said followers is a roller mounted by means for mounting the roller for axial movement between a first position engaged in a groove of a cam plate and a second position disengaged from the groove.

18. In a device according to claim 2, wherein the means for driving each of the cam plates comprises electrically, pneumatically or hydraulic drive means.

19. In a device according to claim 2, wherein the drive means includes a motor rotating at a uniform speed and a switchable clutch disposed in a drive train between the cam plate and the motor.

20. In a device according to claim 1, wherein the pair of shear arms are provided with means for storing part of the closing energy of the arms during the closing of the arms to cut the glass, said means for storing releasing said energy of the subsequent opening of the cutting knives, said means for storing including a spring element positioned on at least one of said arms and being engaged during the closing operation by a member provided on the other arm.

* * * * *